United States Patent
Takagi

(10) Patent No.: US 8,293,050 B2
(45) Date of Patent: Oct. 23, 2012

(54) METHOD AND DEVICE FOR MANUFACTURING BEAD

(75) Inventor: Chikara Takagi, Hashima (JP)

(73) Assignee: Fuji Seiko Co., Ltd., Hashima-shi (JP)

( * ) Notice: Subject to any disclaimer, the term of this patent is extended or adjusted under 35 U.S.C. 154(b) by 0 days.

(21) Appl. No.: 13/060,890

(22) PCT Filed: Jul. 16, 2009

(86) PCT No.: PCT/JP2009/062863
§ 371 (c)(1),
(2), (4) Date: Feb. 25, 2011

(87) PCT Pub. No.: WO2010/047161
PCT Pub. Date: Apr. 29, 2010

(65) Prior Publication Data
US 2011/0155300 A1 Jun. 30, 2011

(30) Foreign Application Priority Data
Oct. 23, 2008 (JP) .................. 2008-273080

(51) Int. Cl.
*B29D 30/48* (2006.01)
(52) U.S. Cl. .......... 156/136; 156/398; 156/421.8; 156/422
(58) Field of Classification Search .......... 156/136, 156/422, 398, 400, 402, 421.4, 421.8
See application file for complete search history.

(56) References Cited

U.S. PATENT DOCUMENTS

| 3,767,509 A | * | 10/1973 | Gazuit | 156/415 |
| 3,971,694 A | * | 7/1976 | Gazuit | 156/415 |
| 4,229,246 A | * | 10/1980 | Vanderzee | 156/417 |
| 5,403,418 A | | 4/1995 | Kikuchi et al. | |
| 5,486,261 A | | 1/1996 | Kikuchi et al. | |
| 6,113,737 A | * | 9/2000 | Siegenthaler | 156/406.2 |

FOREIGN PATENT DOCUMENTS

| JP | 6 106654 | 4/1994 |
| JP | 9 11358 | 1/1997 |
| JP | 2004 66568 | 3/2004 |

OTHER PUBLICATIONS

International Search Report issued Sep. 8, 2009 in PCT/JP09/062863 filed Jul. 16, 2009.

* cited by examiner

*Primary Examiner* — Geoffrey L Knable
(74) *Attorney, Agent, or Firm* — Oblon, Spivak, McClelland, Maier & Neustadt, L.L.P.

(57) ABSTRACT

In a bead manufacturing method and bead manufacturing device, a former rotatably supported on a support base and pivotably holds opposite end portions of a plurality of elastically deformable spring members arranged on an outer circumference thereof with gaps in a circumferential direction for annularly winding a bead filler around the spring members, an actuation mechanism is provided for curving the spring members in the radial directions of the former, and a bead core holding portion is arranged at one end side of the former for holding a bead core. When the spring members are elastically deformed outward in the radial directions of the former to a semicircular shape, the bead filler annularly wound around the spring members are raised up to fixedly fit a short bottom side thereof on the outer circumference of the bead core held at one end side of the former.

10 Claims, 7 Drawing Sheets

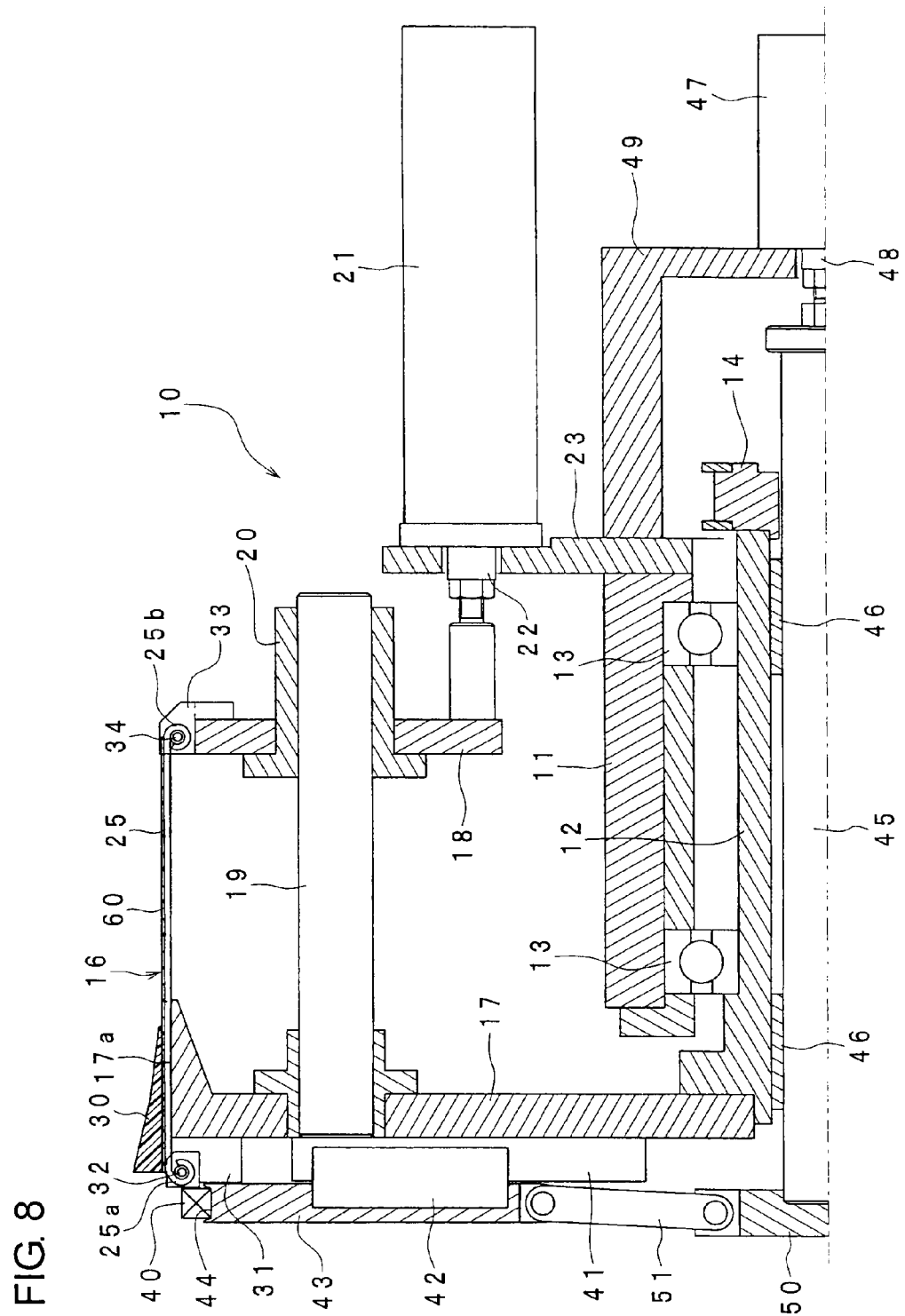

METHOD AND DEVICE FOR MANUFACTURING BEAD

TECHNICAL FIELD

The present invention relates to a method and device for manufacturing a bead wherein a belt-like bead filler with a short bottom side and two long other sides is raised up to be fixedly fitted on the outer circumference of a bead core.

BACKGROUND ART

In a bead used in a pneumatic tire for motor car, generally, a belt-like bead filler which approximately takes a triangle with a short bottom side and two long other sides is raised up to fixedly fit the short side of the bead filler on the outer circumference of a bead core. As a bead manufacturing device of this kind, there has been known one which is described in Patent Document 1, for example.

In the bead manufacturing device described in Patent Document 1, a belt-like apex (bead filler) is annularly wound on the outer circumference of a plurality of circumferentially arranged segments, and the respective segments are turned by link mechanisms from a laid-down position to a raised-up position to fixedly fit a bottom side of the apex which has been turned to the raised-up position, on the outer circumference of the bead ring held by a bead clamper.

PRIOR ART DOCUMENT

Patent Document

Patent Document 1: JP6-106654 A

SUMMARY OF THE INVENTION

Problem to be Solved by the Invention

The bead manufacturing device described in Patent Document 1 takes the construction that the segments raise up the belt-like bead filler immediately throughout the bottom side part and the tip end part. In this case, the rate in stretch becomes larger on the tip end part which is thin in thickness, and therefore, in the prior art construction that the segments immediately raise up the bottom side part and the tip end part, a portion closer to the tip end part becomes unstable in shape and deteriorates in uniformity. As a result, where a green tire incorporating beads manufactured in the manner described above is vulcanized to be shaped, an adverse effect is exerted on the tire itself, thereby causing an anxiety that a problem may arise in the uniformity of the tire.

Further, it has also been practiced heretofore to raise up a belt-like bead filler by using an airbag (bladder). However, the airbag method is accompanied by an anxiety that the use for a long term may cause the airbag to be broken, and hence, involves a problem in terms of durability.

The present invention has been made in order to solve the aforementioned problems in the prior art, and an object thereof is to provide a bead manufacturing method and bead manufacturing device which is able to make the shape uniform and stable in the circumferential direction and to improve uniformity by raising up a bead filler by utilizing a plurality of elastically deformable leaf springs (spring members) arranged circumferentially.

Solution to the Problem

In order to solve the foregoing problems, the feature of the invention of a bead manufacturing method in a first aspect resides in that in a bead manufacturing method in which a belt-like bead filler with a short bottom side and two long other sides is raised up to be fixedly fitted on an outer circumference of a bead core, a plurality of elastically deformable leaf springs arranged circumferentially are provided to be arranged with gaps in a circumferential direction in which one long side of the belt-like bead filler is wound annularly, and by curving the leaf springs, the bead filler is raised up to fixedly fit the short side of the bead filler on the outer circumference of the bead core.

The feature of the invention of a bead manufacturing device in a second aspect resides in that the bead manufacturing device by which a belt-like bead filler with a short bottom side and two long other sides is raised up to be fixedly fitted on an outer circumference of a bead core comprises a support base, a former rotatably supported on the support base and pivotably holding opposite end portions of a plurality of elastically deformable spring members arranged on an outer circumference thereof with gaps in a circumferential direction for winding the bead filler annularly around the spring members, an actuation mechanism for curving the spring members in radial directions of the former, and a bead core holding portion arranged on one end side of the former for holding the bead core.

The feature of the invention of the bead manufacturing device in a third aspect resides in that in the second aspect, the former comprises a rotational shaft rotatably supported on the support base, a first rotary disc attached to the rotational shaft and pivotably holding one ends of the spring members, and a second rotary disc movable toward and away from the first rotary disc in a rotational axis direction of the rotational shaft and pivotably holding the other ends of the spring members, and that the actuation mechanism is configured to relatively move the second rotary disc relative to the first rotary disc in the axial direction of the rotational shaft.

The feature of the invention of the bead manufacturing device in a fourth aspect resides in that in the second or third aspect, the spring members are constituted by rectangular leaf springs which are elastically deformable in radial directions of the rotational shaft.

The feature of the invention of the bead manufacturing device in a fifth aspect resides in that in the fourth aspect, the thickness of each leaf spring is varied in a lengthwise direction so that a portion increased in thickness is made to be hard to elastically deform.

The feature of the invention of the bead manufacturing device in a sixth aspect resides in that in any one of the second to fifth aspects, the plurality of spring members are covered at outer circumferences thereof with an elastic member which is rich in elasticity, not to form gaps on the whole circumference of the former.

Advantageous Effects of the Invention

In the invention of the bead manufacturing method in the first aspect, the plurality of elastically deformable leaf springs arranged circumferentially are provided to be arranged with the gaps in the circumferential direction in which one of the long sides of the belt-like bead filler is wound, and by curving the leaf springs, the bead filler is raised up to fixedly fit the short side of the bead filler on the outer circumference of the bead core. Thus, it is possible to stretch the bead filler which is raised up by the curve operation of the leaf springs, successively from the bottom side part to the tip end part. As a result, the bead filler which is fixedly fitted on the outer circumference of the bead core can be made to a circumferentially uniform and stable shape, and hence, the bead manufacturing method in which uniformity is improved can be realized.

In the invention of the bead manufacturing device in the second aspect, the construction is made by the former rotatably supported on the support base and pivotably holding opposite end portions of the plurality of elastically deformable spring members arranged on the outer circumference thereof with the gaps in the circumferential direction for winding the bead filler annularly around the spring members, the actuation mechanism for curving the spring members in the radial directions of the former, and the bead core holding portion arranged on one end side of the former for holding the bead core. Thus, it is possible to stretch the bead filler which is raised up by the curve operation of the leaf springs, successively from the bottom side part to the tip end part. As a result, the bead filler which is fixedly fitted on the outer circumference of the bead core can be made to a circumferentially uniform and stable shape, and hence, the bead filler fixedly fitted on the bead core is improved in uniformity. In addition, a chance that a breakage may take place in the course of use as is the case of using a bladder in the prior art is little thanks to the use of the spring members, and hence, it is possible to enhance the durability of the bead manufacturing device.

In the invention of the bead manufacturing device in the third aspect, the former comprises the rotational shaft rotatably supported on the support base, the first rotary disc attached to the rotational shaft and pivotably holding one ends of the spring members, and the second rotary disc movable toward and away from the first rotary disc in the rotational axis direction of the rotational shaft and pivotably holding the other ends of the spring members, and the actuation mechanism is configured to relatively move the second rotary disc relative to the first rotary disc in the axial direction of the rotational shaft. Thus, it is possible to reliably curve the spring members in the radial directions of the former through the relative movement of the second rotary disc relative to the first rotary disc by the actuation mechanism.

In the invention of the bead manufacturing device in the fourth aspect, since the spring members are constituted by the rectangular leaf springs which are elastically deformable in the radial directions of the rotational shaft, it is possible to curve the leaf springs in the radial directions of the former easily and reliably.

In the invention of the bead manufacturing device in the fifth aspect, since the thickness of each leaf spring is varied in the lengthwise direction so that the portion increased in thickness is made to be hard to elastically deform, the portions of the leaf springs which portions contact the bead filler raised by curving the leaf springs can be held in the state being almost normal to the axis of the former, and hence, the bead filler can be further improved in uniformity.

In the invention of the bead manufacturing device in the sixth aspect, since the plurality of spring members are covered at outer circumferences thereof with the elastic member which is rich in elasticity, not to form gaps on the whole circumference of the former, it is possible to cover the gaps between the plurality of spring members, and hence, the operation for raising up the bead filler can be stably carried out with a uniform force throughout the whole circumference.

BRIEF DESCRIPTION OF THE DRAWINGS

FIG. 8 is a sectional view of a bead manufacturing device showing a third embodiment of the invention.

EMBODIMENTS FOR PRACTICING THE INVENTION

Figure 1:
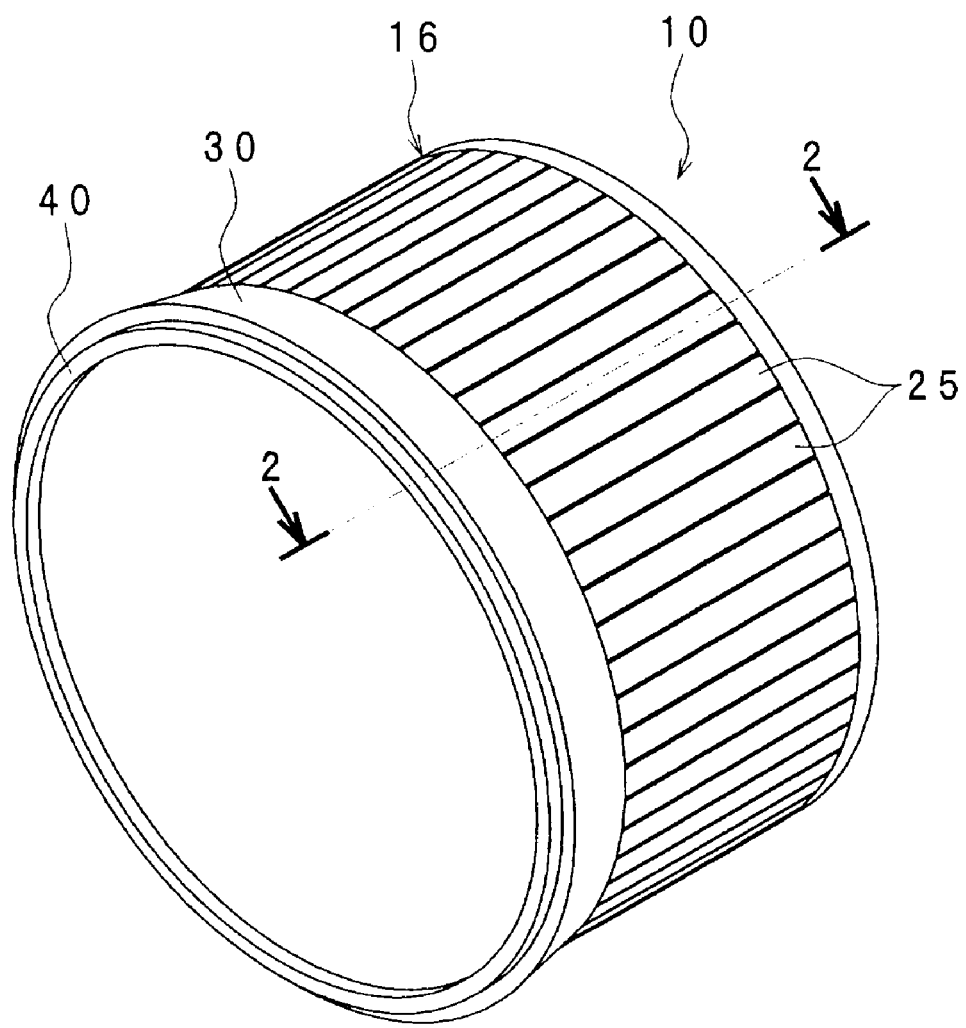
FIG. 1 is an exterior view illustrating the whole of a bead manufacturing device which shows a first embodiment of the present invention.
Figure 2:
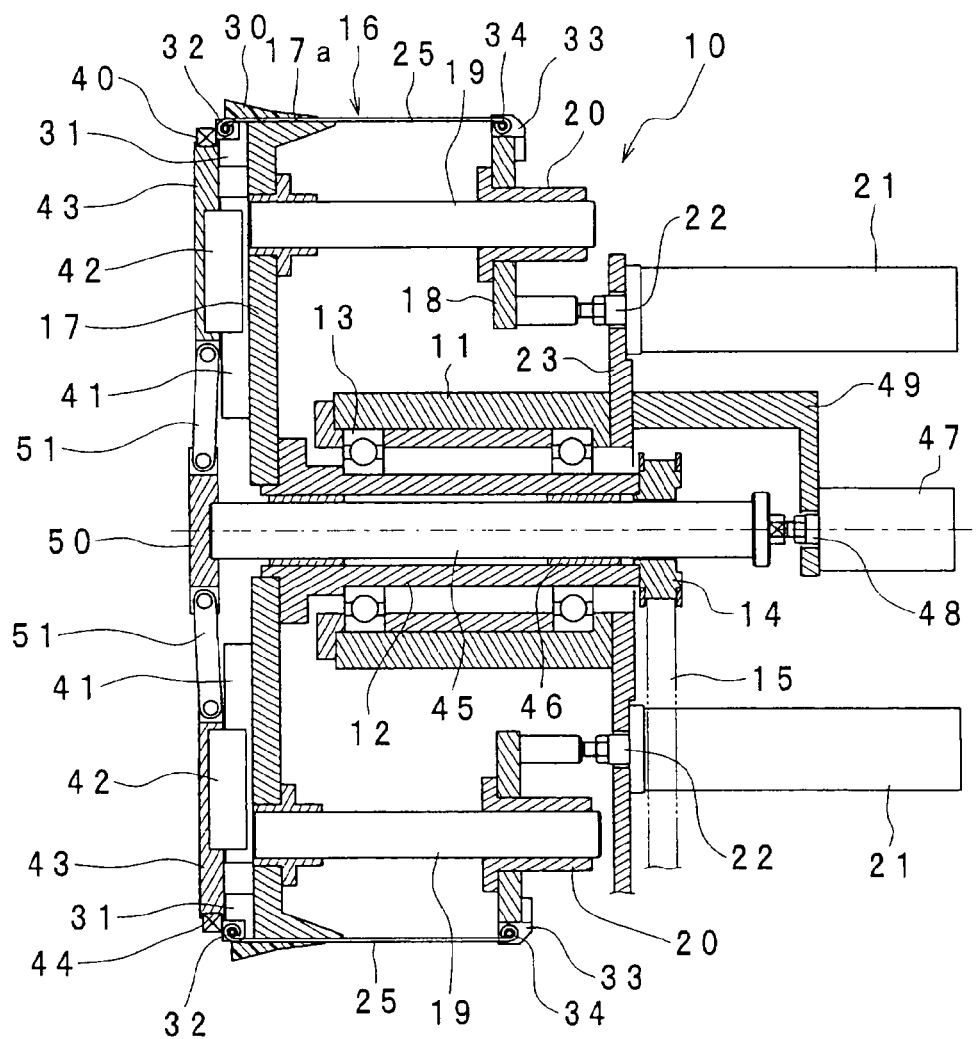
FIG. 2 is a sectional view of the bead manufacturing device taken along the line 2-2 in FIG. 1.

Hereafter, embodiments of the present invention will be described with reference to the drawings. FIG. 1 is an exterior view of a bead manufacturing device 10, and FIG. 2 is a sectional view of the bead manufacturing device 10. As shown in FIG. 2, the bead manufacturing device 10 is provided with a support base 11, and a cylindrical rotational shaft 12 is supported on the support base 11 through bearings 13 to be rotatable about a horizontal axis. A pulley 14 is attached to a rear end portion of the rotational shaft 12, and the pulley 14 is coupled to a motor (not shown) through a belt 15.

The rotational shaft 12 has a former 16 attached thereto. The former 16 is provided with a first rotary disc 17 of a disc-like shape secured to a front end portion of the rotational shaft 12, a second rotary disc 18 of a disc-like shape movable toward and away from the first rotary disc 17 in the axial direction of the rotational shaft 12, and leaf springs 25 of the configuration referred to later. To the first rotary disc 17, a plurality of guide bars 19 arranged circumferentially are attached in parallel to the axis of the rotational shaft 12, and the second rotary disc 18 is slidably guided along these guide bars 19 through guide bushings 20. The second rotary disc 18 is coupled to piston rods 22 of a plurality of actuation cylinder devices 21 arranged circumferentially which constitute actuation means or an actuation mechanism. The second rotary disc 18 is advanced and retracted by the operations of the actuation cylinder devices 21 along the guide bars 19 in the direction to move toward and away form the first rotary disc 17. The actuation cylinder devices 21 are mounted on an attaching plate 23 mounted on the support base 11.

Further, the former 16 is provided with a plurality of leaf springs 25 arranged circumferentially which constitute spring members arranged over the outer circumferences of the first rotary disc 17 and the second rotary disc 18. Each leaf spring 25 takes a rectangular shape whose thickness is uniform, and the length in the lengthwise direction is set to be several times (e.g., three to four times) as long as the length of the long sides of a bead filler 30 referred to later. To be elastically deformable in the radial directions of the former 16, as shown in FIG. 1, the leaf springs 25 are juxtaposed to be directed in the tangential direction on a circle coaxial with the former 16 with slight gaps therebetween.

Figure 3:
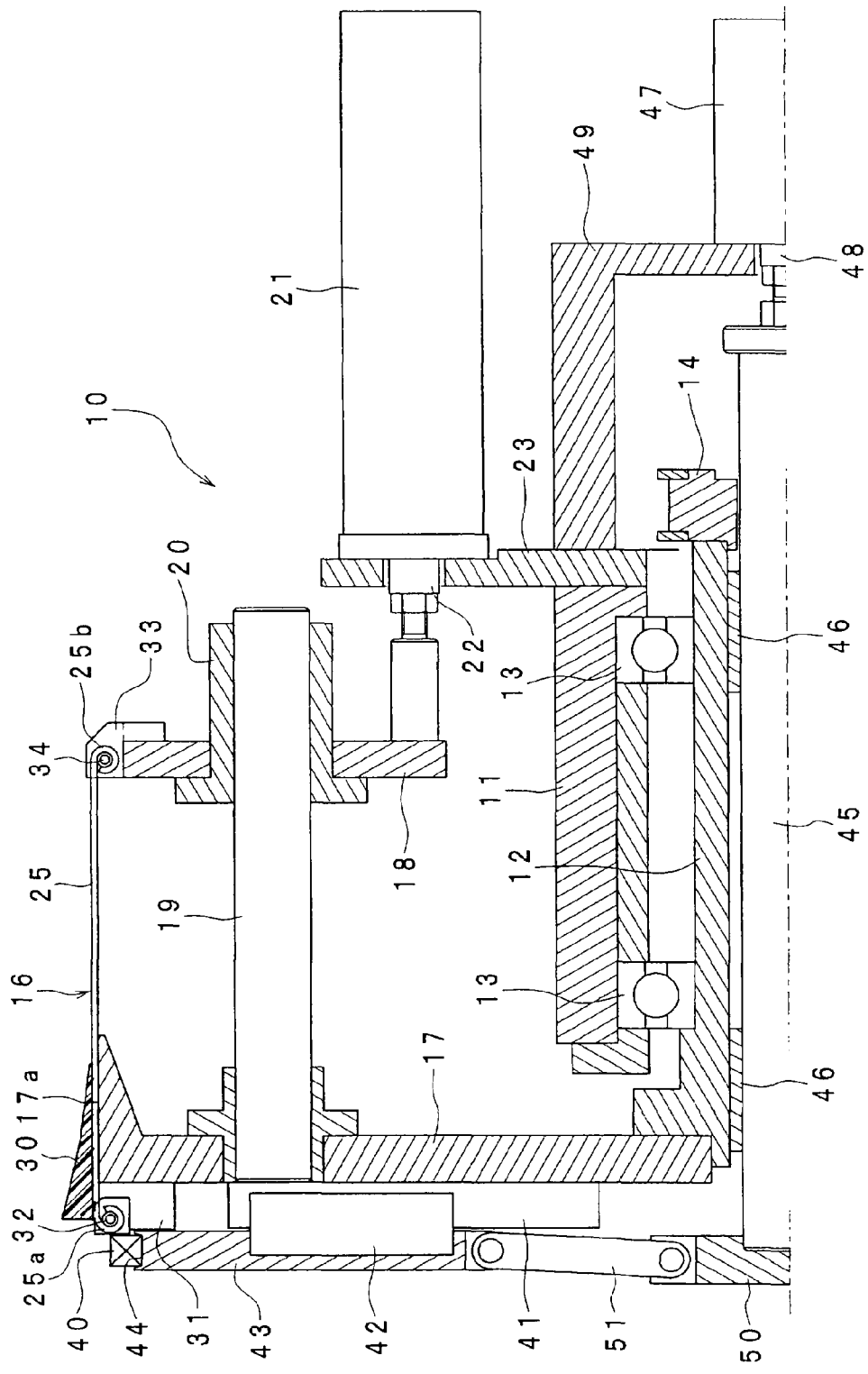
FIG. 3 is an enlarged view which scales up a part in FIG. 2.

Specifically, the first rotary disc 17 has an outer circumferential surface 17a of an axial length corresponding to the length of the long sides of the bead filler 30, and to a front end portion of the outer circumference of the first rotary disc 17, support brackets 31 of the same number as the leaf springs 25 are attached with gaps in the circumferential direction. By the respective support brackets 31, holding pins 32 are supported to be directed in the tangential direction on a circle coaxial with the former 16. As shown in FIG. 3 in detail, an arc support portion 25a formed at one end of each leaf spring 25 is engaged with the holding pin 32, so that each leaf spring 25 is held by the holding pin 32 to be pivotable at one end thereof.

Further, support brackets 33 of the same number as the leaf springs 25 are attached to the outer circumference of the second rotary disc 18 with gaps in the circumferential direction. Holding pins 34 are supported by the support bracket 33 on a circle axially aligned with that for the holding pins 32 and in parallel to the holding pins 32. As shown in FIG. 3 in detail, an arc support portion 25b formed at the other end of each leaf spring 25 is engaged with the holding pin 34, and each leaf spring 25 is held by the holding pin 34 to be pivotable at the other end thereof.

Figure 4:
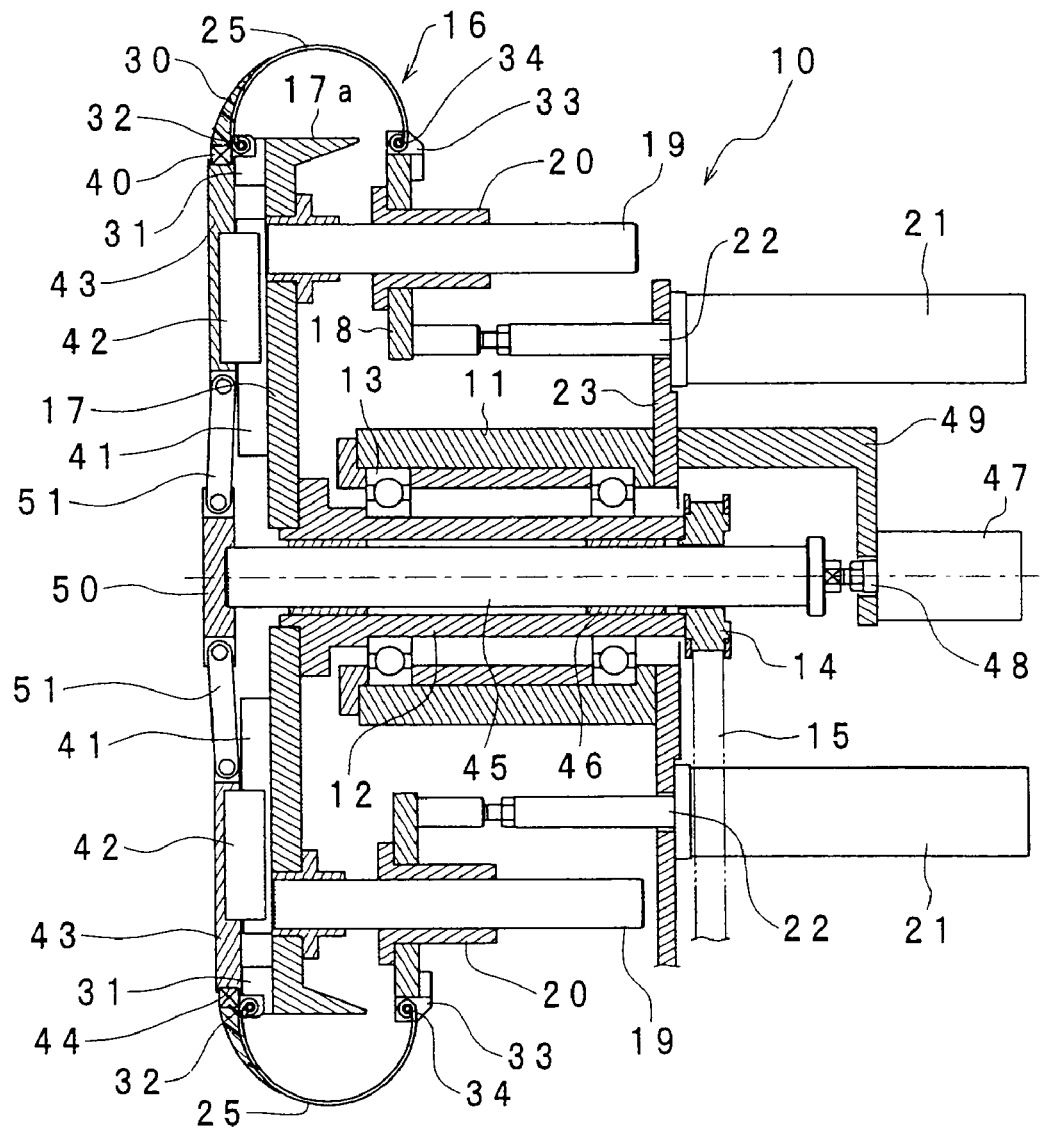
FIG. 4 is a view showing an operational state in FIG. 2.
Figure 5:
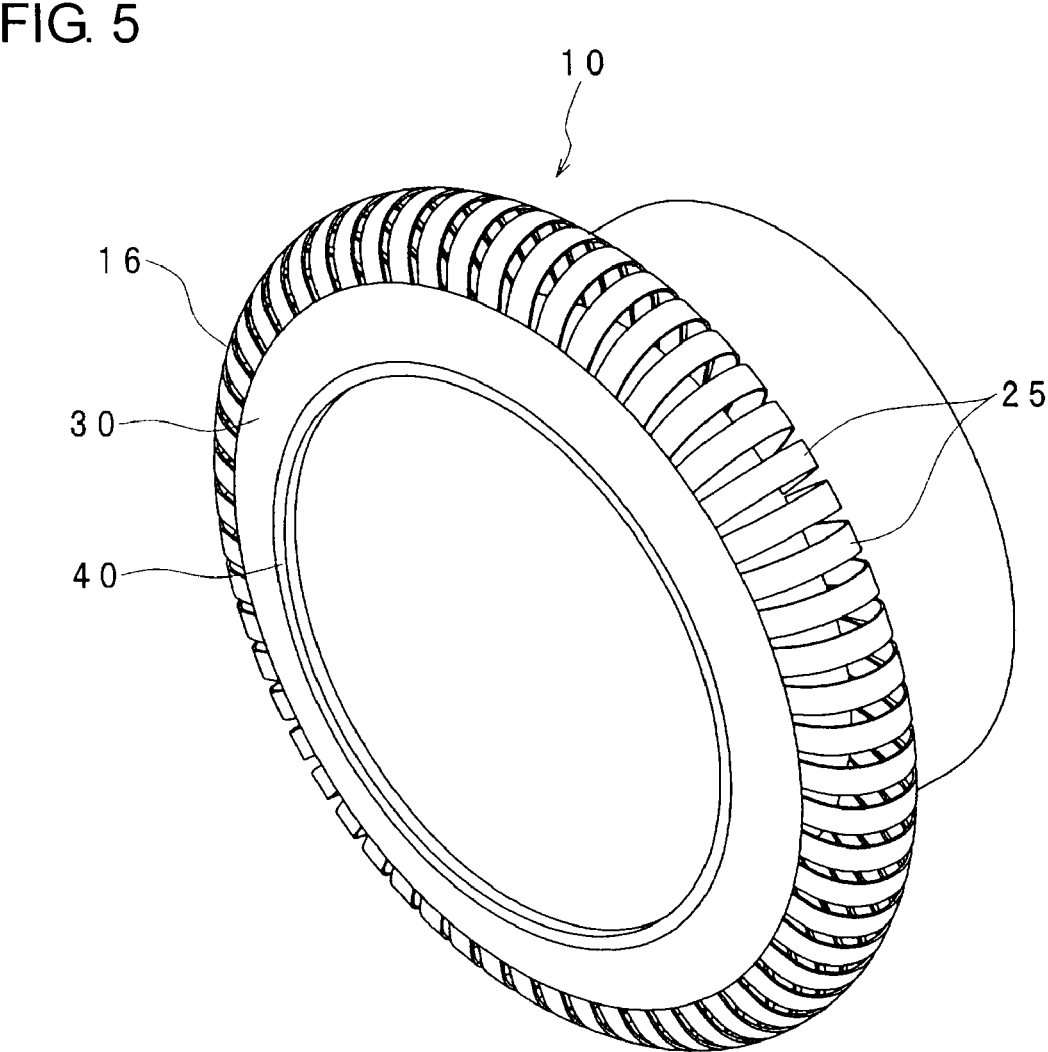
FIG. 5 is a perspective view of the bead manufacturing device, showing the state that leaf springs are curved.

Therefore, by advancing the second rotary disc 18 which pivotably holds other ends of the leaf springs 25, by the actuation cylinder devices 21 in the direction to come close to the first rotary disc 17, the respective leaf springs 25 are curved to an arc shape outward in the radial directions of the former 16, as shown in FIGS. 4 and 5.

A bead filler 30 is set up on the outer circumferential surface of the leaf springs 25 on the first rotary disc 17 side. The bead filler 30 is made of a belt-like rubber which is formed by extrusion molding approximately to a triangle with one short side (bottom side) and two other long sides, and is wound around one end side of the leaf springs 25 so that the bottom side is directed toward the front end side of the former 16 with one long side being in contact with the outer surfaces of the leaf springs 25. The bead filler 30 wound around the outer surfaces of the leaf springs 25 is cut to a predetermined length, and opposite ends thereof are bodily jointed by being pressure-contacted with each other, whereby an annular bead filler 30 is made.

A plurality of guide rails 41 arranged circumferentially are attached to a front end surface of the former 16, that is, to a front end surface of the first rotary disc 17 to extend in the radial directions, and slide blocks 42 are respectively guided on these guide rails 41 to be slidable in the radial directions. Bead core holders 43 are respectively attached to the respective slide blocks 42, and outer surfaces of these bead core holders 43 constitute a bead core holding portion 44 which is able to expand and contract for holding a bead core 40 in concentric relation with the former 16.

In the rotational shaft 12, a slide shaft 45 is slidably supported through guide bushings 46 in the axial direction of the rotational shaft 12. A rear end portion of the slide shaft 45 is coupled to a piston rod 48 of an expansion and contraction cylinder device 47 constituting expansion and contraction means. The expansion and contraction cylinder device 47 is attached to an attaching plate 49 mounted on the support base 11. A front end portion of the slide shaft 45 passes through the center portion of the first rotary disc 17 to protrude ahead of the former 16, and a coupling block 50 is attached to a protruding end. An outer circumferential portion of the coupling block 50 is coupled to the respective slide blocks 42 respectively through link members 51, and by the sliding movement of the slide shaft 45, the respective slide blocks 42 are synchronously moved in the radial directions through the link members 51 to radially expand or contract the bead core holding portion 44.

Next, description will be made regarding a method of manufacturing a bead by the bead manufacturing device 10 according to the aforementioned embodiment. Usually, the piston rods 22 of the actuation cylinder devices 21 are held at a retracted end position, so that the second rotary disc 18 of the former 16 is positioned at a retracted end position where it is spaced from the first rotary disc 17. Thus, the plurality of leaf springs 25 are held in the state that they are linearly extend to their full length, as shown in FIGS. 1 and 2. On the other hand, the piston rod 48 of the expansion and contraction cylinder device 47 is held at an advanced end position with the slide blocks 42 moved radially inward through the link members 51, so that the bead core holding portion 44 constituted by the outer surfaces of the bead core holders 43 is held contracted in diameter.

In this state, a bead core 40 is loaded on the outer circumference of the bead core holding portion 44. Then, with the retraction of the piston rod 48 of the expansion and contraction cylinder device 47, the slide blocks 42 are moved radially outward through the link members 51, whereby the diameter of the bead core holding portion 44 is expanded (the state in FIGS. 2 and 4). As a result, the bead core 40 is clamped on the bead core holding portion 44 in concentric relation with the former 16. The bead core 40 at this time is positioned to a position where the outer circumference thereof comes close to the pivot positions (holding pins 32) on one end side of the leaf springs 25.

On the other hand, a belt-like bead filler 30 is supplied by a supply device (not shown) on the leaf springs 25 constituting the outer circumference of the former 16. That is, the bead filler 30 is supplied around the leaf springs 25 so that the bottom side is directed to one end side of the leaf springs 25 corresponding to the bead core 40, with one long side being in contact with the outer surfaces of the leaf springs 25. One end of the bead filler 30 supplied is clamped by a clamp device (not shown), in which state the former 16 together with the rotational shaft 12 is rotated by the motor (not shown).

With the rotation of the former 16, the bead filler 30 is wound around the leaf springs 25. When the bead filler 30 is fed a predetermined amount to complete one turn around the former 16, the bead filler 30 is cut by cutting means (not shown). Then, the opposite end portions of the bead filler 30 is mutually pressure-contacted by joint means (not shown) to be jointed bodily, whereby an annular bead filler 30 is made. As a result, the bead filler 30 is held at a position (adjacent to the holding pins 32) where the bottom side is close to the outer circumference of the bead core 40 held on the bead core holding portion 44.

Subsequently, the actuation cylinder devices 21 are operated to advance the piston rods 22, whereby the second rotary disc 18 is moved to come close to the first rotary disc 17. Thus, the leaf springs 25 whose opposite ends are pivotably held by the first rotary disc 17 and the second rotary disc 18 are elastically deformed to be gradually curved radially outward. As the second rotary disc 18 is advanced to the advanced end portion as shown in FIG. 4, the leaf springs 25 are curved to an approximately semicircular shape, and following the curving of the leaf springs 25, the bead filler 30 being in contact with the leaf springs 25 is raised up to an angle which becomes approximately normal to the outer circumferential surface 17a of the first rotary disc 17, whereby the bottom side is fixedly fitted on the outer circumference of the bead core 40. At this time, since the bead filler 30 is raised up by the leaf springs 25 being curved, it is not raised up immediately over the bottom side (inner circumference) part and the tip end (outer circumference) part which differ in the rate of stretch, but it is raised up as it is stretched successively from the bottom side part to the tip end part.

Because in this way, the bead filler 30 is stretched successively from the bottom side part to the tip end part by utilizing the curve operation of the leaf springs 25, the bead filler 30 fixedly fitted on the outer circumference of the bead core 40 becomes a circumferentially uniform and stable shape and is improved in uniformity. Further, since the leaf springs 25 are held on the former 16 (the first and second rotary discs 17, 18) with the opposite end portions being pivotable, it is possible to reliably curve the leaf springs 25 through the relative movement of the second rotary disc 18 relative to the first rotary disc 17 by the actuation cylinder devices 21, and in addition, since a chance is little that a breakage may take place in the course of use as is the case of using an airbag (bladder) in the prior art, the durability can be enhanced notably.

Figure 6:
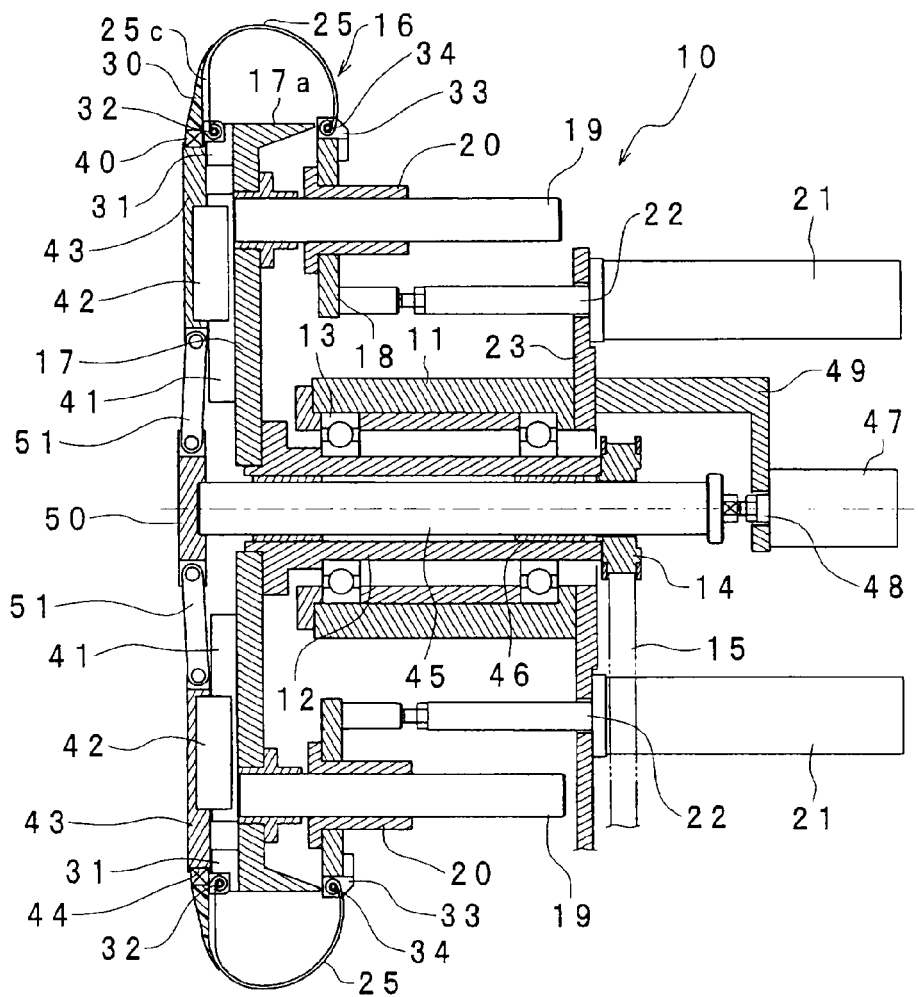
FIG. 6 is a sectional view of a bead manufacturing device showing a second embodiment of the invention.
Figure 7:
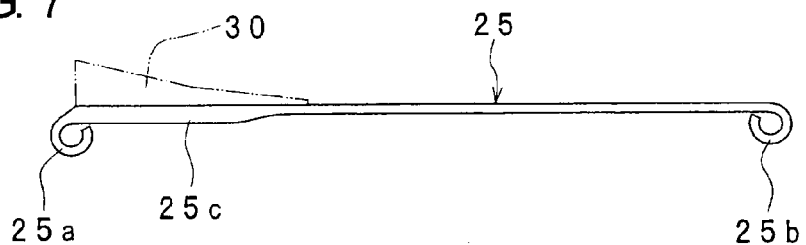
FIG. 7 is a view showing the detail of each leaf spring shown in FIG. 6.

FIGS. 6 and 7 show a second embodiment of the present invention, and the difference from the first embodiment is that each leaf spring 25 is made to be elastically deformed to a desired shape by varying the thickness of each leaf spring 25 in the lengthwise direction, so that the bead filler 40 fixedly fitted on the outer circumference of the bead core 40 can be further stabilized in shape. Other respects than varying the thickness of each leaf spring 25 are the same as those in the first embodiment, and therefore, description regarding the same components as those in the first embodiment will be omitted in place of denoting the same components by the same reference numerals.

That is, in the second embodiment, as shown in FIG. 7, the thickness of each leaf spring 25 is made to be thick at a portion 25c where the belt-like bead core 30 is wound, so that the thick portion 25c is made to be hard to elastically deform in comparison with other portions. By doing so, the leaf spring 25 is elastically deformed to a desired shape, so that it becomes possible to control the expansion locus of the bead filler 30 as desired. As a result, as shown in FIG. 6, when the second rotary disc 18 is advanced to the advanced end position, the thick portion 25 being in contact with the bead core 40 can be held in the state being almost normal to the rotational axis of the former 16, so that the bead filler 30 can be further improved in uniformity.

FIG. 8 shows a third embodiment of the present invention, wherein in order that no gaps are formed between the leaf springs 25 curved radially outward of the former 16, the plurality of leaf springs 25 are covered with a ring-like elastic member 60 which is rich in elasticity, throughout the whole circumference of the former 16.

According to the third embodiment, since gaps between the leaf springs 25 are eliminated by the elastic member 60, it becomes possible to press the bead filler 30 over the whole circumference of the same, and hence, it becomes possible to carry out the raising-up operation of the bead filler 30 stably. Further, by covering the leaf springs 25 with the elastic member 60, it may also be possible to reduce the number of the leaf springs 25.

In the foregoing embodiments, description has been made regarding the examples that the leaf springs 25 are used as spring members. However, the spring members in the present invention are not necessarily limited to the leaf springs 25, and there may be used cylindrical spring members, for example. Further, it is also possible to use the cylindrical spring members with the same embedded in an elastic member which is rich in elasticity.

Although the present invention has been described hereinbefore based on the embodiments, the present invention is not limited to the constructions described in the embodiments and may take various forms without departing from the scope of claims.

Industrial Applicability

The bead manufacturing method and manufacturing device according to the present invention is suitable for manufacturing beads each with a bead filler fixedly fitted on the outer circumference of a bead core, for use in automotive tires.

The invention claimed is:

1. A bead manufacturing method in which a belt-like bead filler, with a short bottom side forming a relatively thick end and two long other sides meeting to form a relatively thin end, is raised up to be fixedly fitted on an outer circumference of a bead core, the method comprising:
   providing a plurality of elastically deformable leaf springs arranged circumferentially with gaps in a circumferential direction, to provide an annular former, the leaf springs each being elongated between two ends thereof which are mounted at pivot axes;
   providing the bead filler on the plurality of elastically deformable leaf springs, a long side of the bead filler being circumferentially wound on the plurality of elastically deformable leaf springs adjacent one of the ends of the leaf springs, such that the relatively thick end of the bead filler is closer to the one of the ends of the leaf springs and the relatively thin end of the bead filler is farther from the one of the ends of the leaf springs;
   arranging the bead core of a tire in proximity to the annular former and adjacent the one of the ends of the leaf springs such that the outer circumference of the bead core is at the radial position of the pivot axis of the one of the ends of the leaf springs; and
   moving an end of the elastically deformable springs linearly toward another end of the elastically deformable springs, thereby curving the leaf springs between said ends and raising up the bead filler to fixedly fit the relatively thick end of the bead filler on the outer circumference of the bead core, such that the bead filler is stretched progressively from the relatively thick end to the relatively thin end.

2. A bead manufacturing device by which a belt-like bead filler with a short bottom side forming a relatively thick end and two long other sides meeting to form a relatively thin end, is raised up to be fixedly fitted on an outer circumference of a bead core, the device comprising:
   a support base,
   a former including a portion rotatably supported on the support base and pivotably holding opposite end portions of a plurality of elastically deformable spring members arranged on an outer circumference thereof with gaps in a circumferential direction for winding the bead filler annularly around the spring members,
   an actuation mechanism adapted to move one of the end portions of the elastically deformable spring members linearly toward the other of the end portions of the elastically deformable spring members, for pivoting the other of the pivotally held end portions about a pivot axis thereof and curving the spring members in a radial direction of the former, and
   a bead core holding portion arranged on one end side of the former for holding the bead core, wherein the bead core holding portion is radially positionable such that the outer circumference of the bead core is at the radial position of the pivot axis, whereby the relatively thick end of a bead filler raised up by the curving of the spring members may be fixedly fit on the outer circumference of the bead core.

3. The bead manufacturing device in claim 2, wherein the former comprises:
   a rotational shaft rotatably supported on the support base,
   a first rotary disc attached to the rotational shaft and pivotably holding one ends of the spring members, and a second rotary disc movable toward and away from the first rotary disc in a rotational axis direction of the rotational shaft and pivotably holding the other ends of the spring members, and wherein the actuation mechanism is configured to relatively move the second rotary disc relative to the first rotary disc in the axial direction of the rotational shaft.

4. The bead manufacturing device in claim 2, wherein the spring members comprise rectangular leaf springs which are elastically deformable in radial directions of a rotational shaft.

5. The bead manufacturing device in claim 4, wherein the thickness of each leaf spring is varied in a lengthwise direction so that a portion increased in thickness is made to be hard to elastically deform.

6. The bead manufacturing device in claim 2, wherein the plurality of spring members are covered at outer circumferences thereof with an elastic member which is rich in elasticity, not to form gaps on the whole circumference of the former.

7. The bead manufacturing device in claim 3, wherein the plurality of spring members are covered at outer circumferences thereof with an elastic member which is rich in elasticity, not to form gaps on the whole circumference of the former.

8. The bead manufacturing device in claim 4, wherein the plurality of spring members are covered at outer circumferences thereof with an elastic member which is rich in elasticity, not to form gaps on the whole circumference of the former.

9. The bead manufacturing device in claim 5, wherein the plurality of spring members are covered at outer circumferences thereof with an elastic member which is rich in elasticity, not to form gaps on the whole circumference of the former.

10. The bead manufacturing device in claim 3, wherein the spring members comprise rectangular leaf springs which are elastically deformable in radial directions of the rotational shaft.

* * * * *